A. CLÉMENT.
MEANS FOR MOUNTING PROPELLER SHAFTS.
APPLICATION FILED FEB. 6, 1909.
954,077.
Patented Apr. 5, 1910.
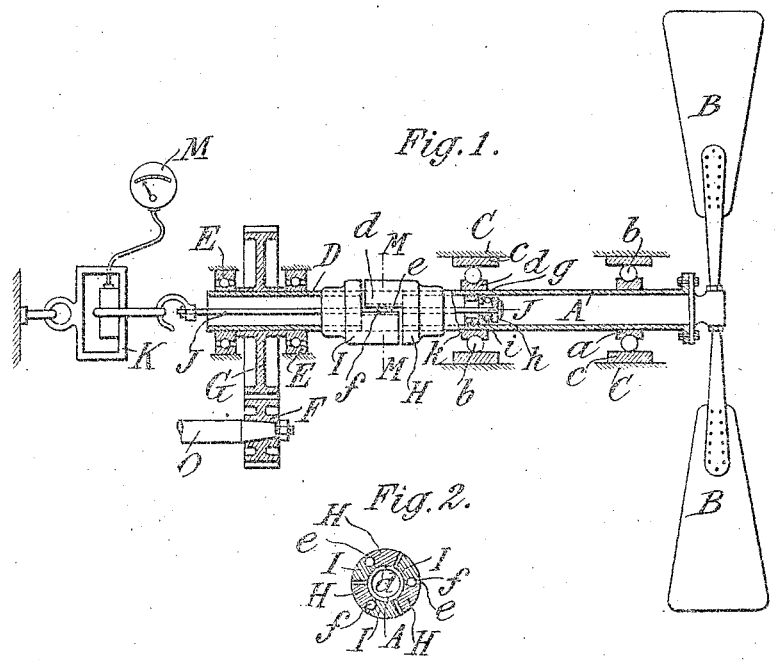
Witnesses:
Inventor:
Adolphe Clément,
By Attorneys,

UNITED STATES PATENT OFFICE.

ADOLPHE CLÉMENT, OF LEVALLOIS-PERRET, FRANCE.

MEANS FOR MOUNTING PROPELLER-SHAFTS.

954,077.   Specification of Letters Patent.   Patented Apr. 5, 1910.

Application filed February 6, 1909. Serial No. 476,516.

*To all whom it may concern:*

Be it known that I, ADOLPHE CLÉMENT, a citizen of the Republic of France, residing in Levallois-Perret, Seine, France, have invented certain new and useful Improvements in Means for Mounting Propeller-Shafts, of which the following is a specification.

This invention has for its object a means for controlling a screw propeller which enables the tractional or propelling effort when stationary or in running to be measured, this controlling means being specially applicable to dirigible balloons. Under the invention the shaft of the screw is mounted in such a manner that it is free to move axially; the shaft is then locked to a measuring apparatus by means of a direct connection whereby the tractional or propelling effort exerted upon the screw may be ascertained. The freedom of the shaft to move axially is insured by the provision of ball bearings, the outer cage ring of which is plane, that is to say it is not provided with a groove as is usually the case, and also by driving means capable of transmitting the motor couple but incapable of exerting an axial movement.

The arrangement of the device under the invention will be readily understood by the following description and with reference to the accompanying drawing, in which:—

Figure 1 is a longitudinal elevation of the device, and Fig. 2 is a section on the line M—M in Fig. 1.

The shaft A of the screw propeller B is hollow and rotates in ball bearings each of which is constituted by an inner cage ring $a$ provided with a circumferential groove for holding the balls $b$ and a ring $c$ held in a support C. The outer rings $c$ are plane, that is to say they are not formed with the usual groove, so that the balls are unable to present resistance to movement in the direction parallel with the axis of the shaft A. The shaft A is connected to a hollow shaft D in alinement with it, which shaft is mounted between ordinary ball bearings E E and which is driven from the driving shaft O by any suitable means such for example as a pinion F and a gear wheel G. The connection between the two shafts A and D which are in alinement, is established by means of two sleeves H I, the sleeve H being keyed upon the driving shaft D and the sleeve I upon the driven shaft A; these sleeves may be provided with a variable number of arms $d$ (in Fig. 2 of the drawing it has been assumed that each sleeve has three arms). Between these arms, which are provided with longitudinal grooves $e$, one or more balls $f$ are interposed; the rotation of the sleeve H is transmitted to the sleeve I through these balls. Although these balls, which are engaged in the longitudinal grooves $e$, transmit the motor couple, they are unable to retain the shaft as they rotate upon themselves in the longitudinal direction if an axial movement is exerted upon the shaft.

A rod J extends through the driving shaft D and driven shaft A terminating in the latter in a ball-bearing constituted by two rings $g$ $h$ and balls $i$; this bearing rests upon a ring $k$ screwed or otherwise secured in the hollow shaft A. The other end of the rod J is attached to the measuring appliance which may be, for example, a liquid dynamometer K in communication with a pressure gage M, or a graduated spring or a balance beam with cursor.

The above-described arrangement is given by way of example only and the manner of carrying out the invention and the constructional details may be modified according to circumstances and requirements without departing from the spirit of the invention.

This device may be fitted to an apparatus for testing screws when stationary.

What I claim and desire to secure by Letters Patent of the United States is:—

1. In combination a screw propeller for driving a vehicle, a shaft for said propeller and ball bearings for said shaft, one ring of which bearings is flat in cross section, so that the balls present no resistance to axial movement of the shaft and whereby the shaft is free to move in accordance with the propelling force.

2. In combination a screw propeller for driving a vehicle, a dynamometer, a shaft for said propeller, and ball bearings for said shaft, one ring of which bearings is flat in cross section so that the balls do not present resistance to movement in the direction parallel with the axis of the shaft, said shaft being adapted to act on said dynamometer by such axial movement.

3. In combination a screw propeller for driving a vehicle, a shaft for said propeller mounted to move axially under the propelling force, a driving shaft, and claw sleeves on the respective shafts between which are balls arranged in longitudinal grooves formed on the claws, so as to permit free axial movement of one of the sleeves relatively to the other.

4. In combination a screw propeller for driving a vehicle, a dynamometer, a shaft for said propeller mounted to move axially and to act on said dynamometer by such axial movement, a driving shaft, claw sleeves on the respective shafts between which are balls arranged in longitudinal grooves formed on the claws, thereby permitting of the free axial movement of one of the sleeves relatively to the other.

5. In combination a screw propeller for driving a vehicle, a shaft for said propeller mounted to move axially under the influence of the propelling force, a driving shaft in alinement with said propeller shaft and driving the same, both said shafts being hollow, a device to which the axial movement of the propeller shaft is transmitted, and a rod for transmitting such movement connected with said device at one of its ends, and engaging the propeller shaft at its other end by means of a ball bearing.

6. In combination a screw propeller for driving a vehicle, a dynamometer, a shaft for said propeller mounted to move axially, a driving shaft in alinement with said propeller shaft and driving the same, both said shafts being hollow, and a rod connected with the dynamometer at one of its ends and engaging the propeller shaft at its other end by means of a ball bearing.

In witness whereof, I have hereunto signed my name in the presence of two subscribing witnesses.

ADOLPHE CLÉMENT.

Witnesses:
JULES ARMENGAUD, Jeune,
ELLWOOD AUSTIN WELDEN.